United States Patent [19]

Itatsu

[11] Patent Number: 5,484,975
[45] Date of Patent: Jan. 16, 1996

[54] SPOT WELDING APPARATUS

[75] Inventor: Makoto Itatsu, Tama, Japan

[73] Assignee: Nissan Motor Co. Ltd., Yokohama, Japan

[21] Appl. No.: 272,988

[22] Filed: Jul. 15, 1994

[30] Foreign Application Priority Data

Jul. 22, 1993 [JP] Japan .................................. 5-181710

[51] Int. Cl.⁶ ................................................. B23K 11/10
[52] U.S. Cl. ............................................................ 219/86.7
[58] Field of Search .................. 219/86.51, 110, 219/117.1, 86.25, 86.7

[56] References Cited

U.S. PATENT DOCUMENTS

| | | | |
|---|---|---|---|
| 4,484,056 | 11/1984 | Rossell | 219/86.51 |
| 5,138,127 | 8/1992 | Fries et al. | 219/86.51 |
| 5,225,647 | 7/1993 | Dufrenne | 219/86.51 |
| 5,386,092 | 1/1995 | Dufrenne | 219/86.51 |

FOREIGN PATENT DOCUMENTS

| | | |
|---|---|---|
| 278185A1 | 8/1988 | European Pat. Off. . |
| 58-125679 | 8/1983 | Japan . |
| 61-186177 | 8/1986 | Japan . |
| 63-199086 | 8/1988 | Japan . |

Primary Examiner—Clifford C. Shaw
Attorney, Agent, or Firm—Lowe, Price, Leblanc & Becker

[57] ABSTRACT

A spot welding apparatus comprises a welding gun having a pair of opposing welding electrodes either one of which is movable towards the other to apply a pressure onto a work and away from the other to release the pressure, a servomotor attached to the welding gun for adjusting the pressure applied to the work through movement of the movable welding electrode, a servomotor controller for controlling an operation of the servomotor, a welding current regulator for adjusting a value of welding current applied through the opposing electrodes to the work, a weld-interval timer arranged for adjusting at least one weld time interval and weld timing for the welding current and the pressure both applied to the work, and a spot welding controller electronically connected to the servomotor controller, the welding current regulator and the weld-interval timer, for simultaneously and arbitrarily adjusting a welding condition, namely the welding current, the pressure, the weld time interval and the weld timing, during a cycle of spot welding at every welding point on the work or at one specified welding point on the work.

5 Claims, 5 Drawing Sheets

SPOT WELDING APPARATUS

BACKGROUND OF THE INVENTION

1. Field of the Invention

The present invention relates to a spot welding apparatus in which a spot-weld is made by applying pressure onto both sides of a work through a pair of opposing welding electrodes, and specifically to an apparatus incorporated in a spot welding robot in a manner so as to variably control a welding condition, such as a weld time-interval, a welding current, and a pressure applied to a work through the opposing welding electrodes.

2. Description of the Prior Art

As is generally known, a spot welding apparatus is used to produce a spot weld for a work such as panel materials. The spot ks welding apparatus traditionally includes a C-shaped or X-shaped gun arm having a pair of welding tips on its opposing ends spaced apart from each other. The welding tips serve as welding electrodes. One of the welding tips is movable toward or away from the other by way of air pressure produced by an air cylinder which is mechanically linked to the movable welding tip. In actual, use the pressure acting on the work is determined depending on the magnitude of thrust caused by the air cylinder. In recent years, there has been developed a spot-welding robot with a spot welding apparatus. In the event that a spot welding is made onto a work such as panel materials by utilizing the spot welding robot, spot welding would be in general made with respect to a plurality of weld points on one work. To obtain optimal welding, a welding condition for the respective weld point must be often varied. For instance, in case that a spot welding is made onto a work having at least two different plate thicknesses or onto a coated work by using one set of prior art spot welding apparatus with an air cylinder, pressure applied to the work is actually changed by varying the output pressure produced by the air cylinder by means of a pressure control valve such as an electromagnetic solenoid valve or the like. In such a conventional spot welding apparatus with an air cylinder, the relation between the welding time and the welding current could be electronically controlled through a timing control. On the other hand, a pressure which is applied onto the work by the opposing welding electrodes is remained constant, while a spot-weld is being made to a certain weld point. Although the pressure applied onto the work can be changed at each of different weld points, it may be difficult to timely and arbitrarily vary the pressure applied onto one weld point by way of the air cylinder during welding onto the same. Assuming that the pressure applied onto the one work must be frequently changed by means of the air cylinder, the cycle time of the entire welding work may be increased since the air cylinder has a relatively low following characteristics, namely a low responsiveness in a change of the cylinder stroke. In prior art spot welding apparatus with an air cylinder, a welding condition would be limited owing to low control response characteristics of the air cylinder and undesired dispersion of pressure output from the air cylinder. This results in relatively great spatter loss, or unsatisfactory quality of a weld zone.

SUMMARY OF THE INVENTION

Accordingly, it is an object of the present invention to provide an improved spot welding apparatus which avoids the foregoing disadvantages of the prior art.

It is another object of the invention to provide a spot welding apparatus which can make a spot-weld under an optimal welding condition, irrespective of various types of work, such as a work having different plate thicknesses, a coated work or the like.

In order to accomplish the aforementioned and other objects of the invention, a spot welding apparatus comprises a welding gun having a pair of opposing welding electrodes either one of which is movable towards the other to apply a pressure onto a work and away from the other to release the pressure, a servomotor attached to the welding gun for adjusting the pressure applied to the work through movement of the movable welding electrode, a servomotor controller for controlling an operation of the servomotor, a welding current regulator for adjusting a value of welding current applied through the opposing electrodes to the work, a weld-interval timer arranged for adjusting at least one weld time interval and weld timing for the welding current and the pressure both applied to the work, and a spot welding controller electronically connected to the servomotor controller, the welding current regulator and the weld-interval timer, for simultaneously and arbitrarily adjusting the welding current, the pressure, the weld time interval and the weld timing, based on teaching data during one cycle of spot welding at one specified welding point on the work.

It is preferable that the spot welding apparatus may include means for providing a given welding mode for one specified welding point on the work, in which (a) a first pressure having a given pressure level and a first welding current having a given low current value are applied to the work for a first period of weld time, (b) a second pressure having a higher pressure level than the first pressure and a second welding current which current increases in proportion to an elapsed time after the first period has elapsed, are applied to the work for a second period of weld time, (c) a third pressure having a standard predetermined medium pressure level midway between the first and second pressures and a third welding current having a given high current value are applied to the work for a third period of weld time, (d) a fourth pressure having a higher pressure level than the third pressure and a fourth welding current which current decreases in proportion to an elapsed time after the third period has elapsed, are applied to the work for a fourth period of weld time, and (e) a fifth pressure having a given lower pressure level than the third pressure and a fifth welding current having a given low current value are applied to the work for a fifth period of weld time, and the first to fifth periods are arrayed in that order.

According to another aspect of the invention, a spot welding apparatus, comprises a welding gun having a pair of opposing welding electrodes either one of which is movable towards the other to apply a pressure onto a work and away from the other to release the pressure, a servomotor attached to the welding gun for adjusting the pressure applied to the work through movement of the movable welding electrode, a servomotor controller for adjusting a rotational movement of the servomotor through a numerical control to produce the movement of the movable welding electrode, a welding transformer for adjusting a value of welding current applied through the opposing electrodes to the work, a weld-interval timer arranged for adjusting at least one weld time interval and weld timing for the welding current and the pressure both applied to the work, and a spot welding controller electronically connected to the servomotor controller, the welding transformer and the weld-interval timer, for simultaneously and arbitrarily adjusting the welding current, the pressure, the weld time interval and the weld timing, based on teaching data, wherein the spot welding controller includes a spatter-loss reduction means for reducing spatter loss by stepping up the pressure applied to the work to a greater pressure level than a predetermined medium pressure applied to the work for predetermined intermediate weld time interval for a predetermined first time period shorter than the predetermined intermediate weld time interval just after starting to apply the welding current and for a predetermined second time period shorter than the predetermined intermediate weld time interval just before terminating to apply the welding current, during one cycle of spot welding at one specified welding point on the work. Preferably, at the spot welding controller operates for simultaneously and arbitrarily adjusting the welding current, the pressure, the weld time interval and the weld timing based on the teaching data during one cycle of spot welding at one specified welding point on the work.

In accordance with yet another aspect of the invention, it is preferable that the spot welding controller of such a spot welding apparatus operates so that the pressure is stepped up and down to a plurality of pressure levels and that the welding current is linearly increased for a predetermined short time duration after initiation of application of the welding current and is held constant at a predetermined current level for a predetermined time duration after reaching the predetermined current level, and is then decreased linearly to zero for a predetermined short time duration until termination of application of the welding current.

DESCRIPTION OF THE PREFERRED EMBODIMENTS

Figure 1:
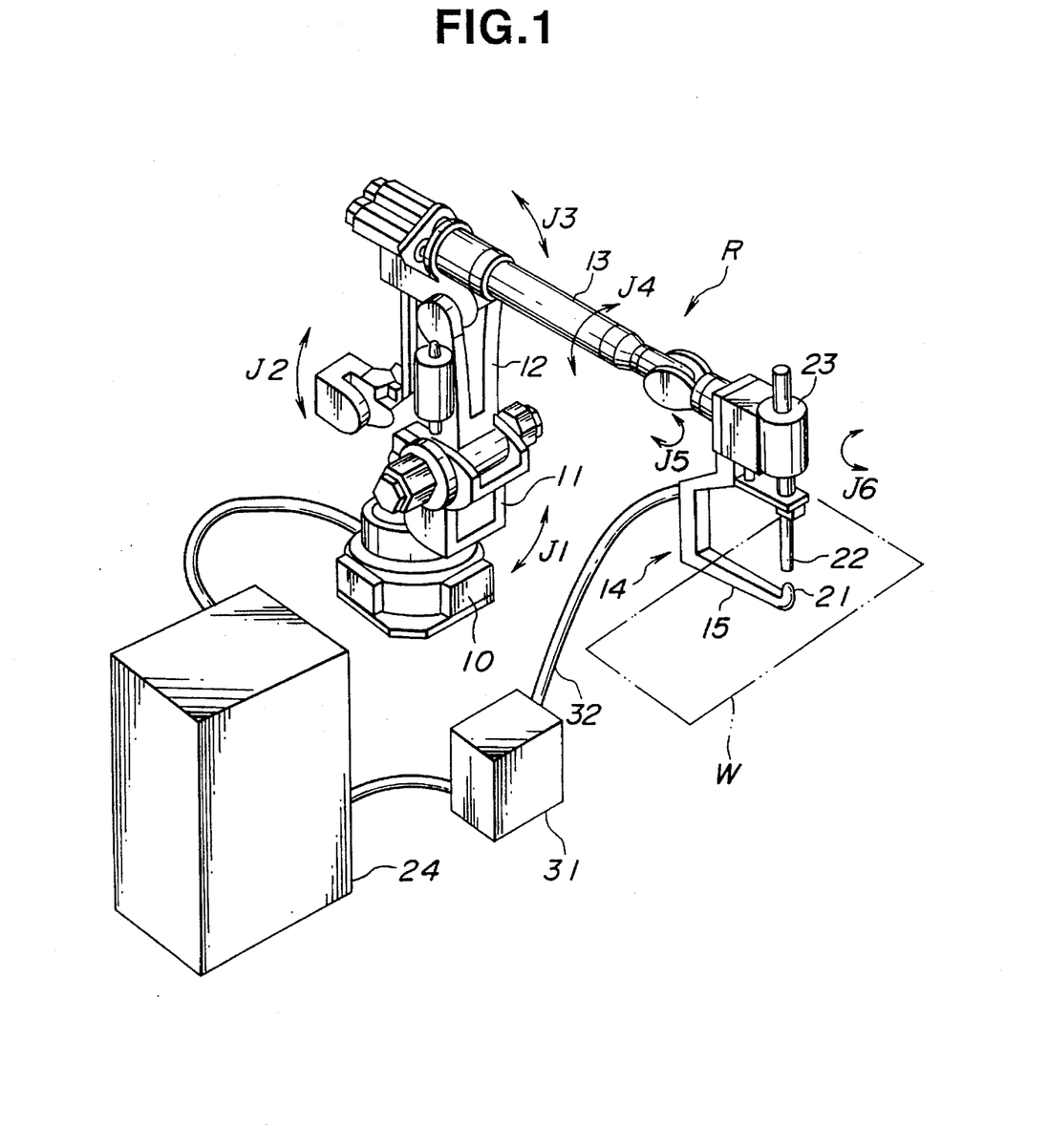
FIG. 1 is a schematic perspective view illustrating one embodiment of a spot welding robot employing a spot welding apparatus according to the invention.
Figure 2:
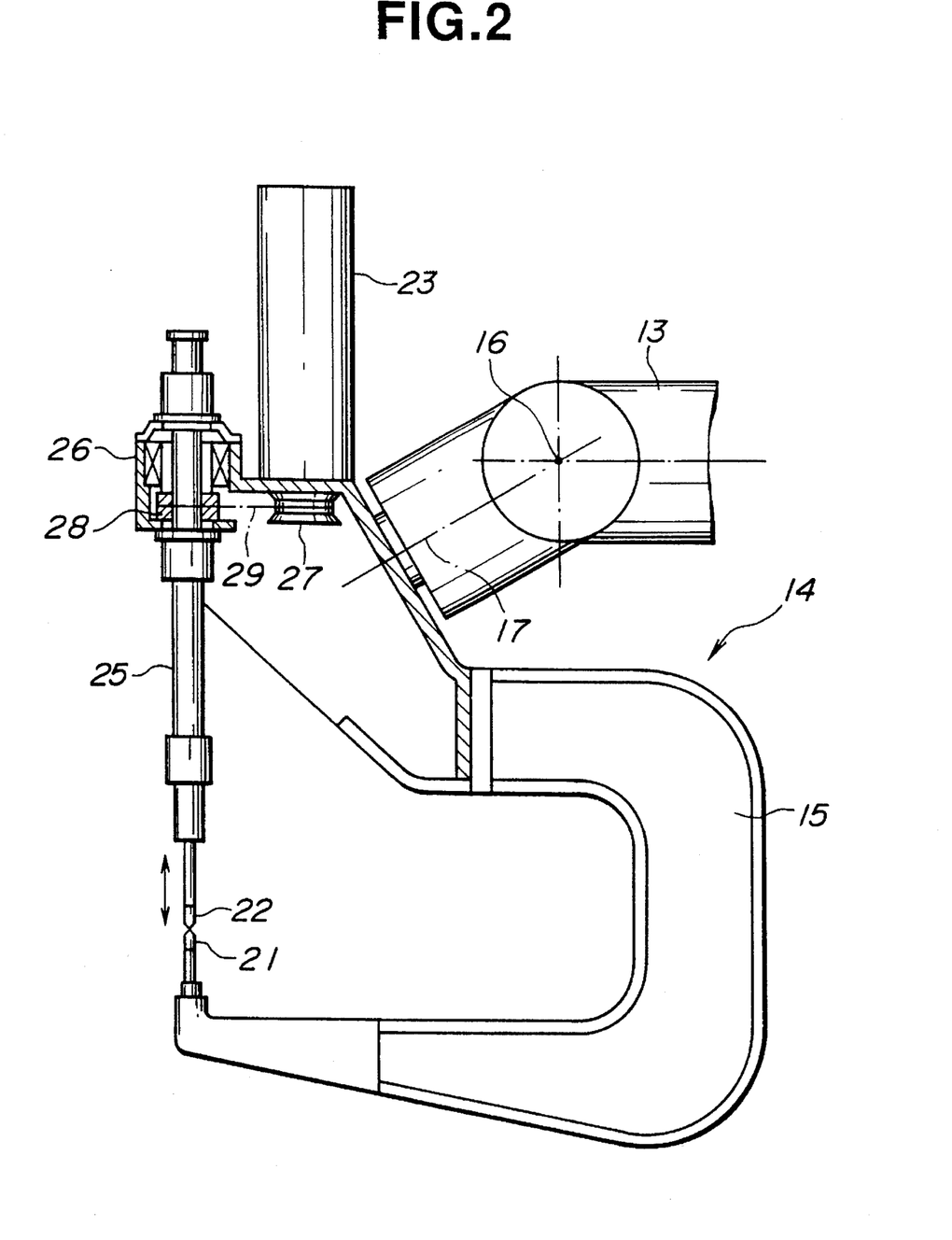
FIG. 2 is an elevational view illustrating a detail of a welding gun of a spot welding apparatus shown in FIG. 1.

Referring now to the drawings, particularly to FIGS. 1 and 2, the spot welding apparatus of the invention is exemplified in case of a spot welding robot R for panel materials. As seen in FIG. 1, the spot welding robot R includes a stationary base 10 mounted on a floor (not shown), a rotary base 11 which is rotatably mounted on the stationary base 10 and rotatable about the central axis of the base 10 in a rotational direction shown in the arrow $J_1$, a first robot arm 12 which is pivotably mounted on the rotary base 11 and pivotable about a first horizontal connection axis between the base 11 and the arm 12 in a pivotal direction shown in the arrow $J_2$, and a second robot arm 13 which is pivotably mounted on the first robot arm 12 and pivotable about a second horizontal connection axis between the arm 12 and the arm 13 in a pivotal direction shown in the arrow $J_3$ and rotatable about the central axis thereof in a rotational direction shown in the arrow $J_4$. The spot welding robot R is formed with a welding gun 14 which is rotatably supported on the pivotal end portion of the second robot arm 13. As clearly seen in FIGS. 1 and 2, the welding gun 14 is pivotable about a horizontal pivot axis 16 (viewing FIG. 2) of the pivotal end portion of the second robot arm 13 in a pivotal direction shown in the arrow $J_5$ and rotatable about a central axis 17 of the pivotal end portion of the arm 13 in a rotational direction shown in the arrow $J_6$. As appreciated, the spot welding robot R has an angular position adjustment function for the previously-noted six axes. As seen in FIG. 2, the welding gun 14 is formed with a C-shaped gun arm 15. The gun arm 15 has a pair of opposing welding electrodes, one being a stationary welding tip 21 serving as a first welding electrode and the other being a movable welding tip 22 serving as a second welding electrode. In the spot welding apparatus according to the invention, a servomotor 23 is attached to the gun arm 15 to produce a movement of the movable welding tip 22 toward or away from the stationary welding tip 21. Actually, the movable welding tip 22 is attached onto the bottom end of a drive rod 25 which is axially slidably supported by a bearing 26. The upper portion of the drive rod 25 is formed with a worm shaft having recirculating balls (not shown). A recirculating ball nut 28 is rotatably fitted onto the worm shaft through the recirculating balls in a conventional manner. As is generally known, such recirculating ball connection acts to convert a rotational motion of the nut 28 to a linear motion of the worm shaft attached to the upper portion of the drive rod 25. As appreciated from FIG. 2, the nut 28 has a driven connection with a timing-belt pulley 27 through a timing belt 29. The timing-belt pulley 27 is connected to the output shaft of the servomotor 23. Thus, the drive rod 25 can be axially moved by driving the servomotor 23. Reference numeral 24 designates a spot welding robot control system provided to adjust angular positions about the above-noted six axes and the axial position of the drive rod 25. Returning to FIG. 1, a welding control unit 31 is electronically connected to the robot control system 24 and has a welding transformer 33 illustrated in FIG. 3. The welding transformer 33 is conventionally arranged to adjust a welding current flowing across a work W sandwiched between the two welding tips 21 and 22 respectively connected to a current-supply cable 32. The welding control unit 31 also includes a weld-interval timer 34 (see FIG. 3) which is generally arranged for adjusting a welding timing including a welding time interval during which a welding current is applied between the welding tips 21 and 22.

Figure 3:
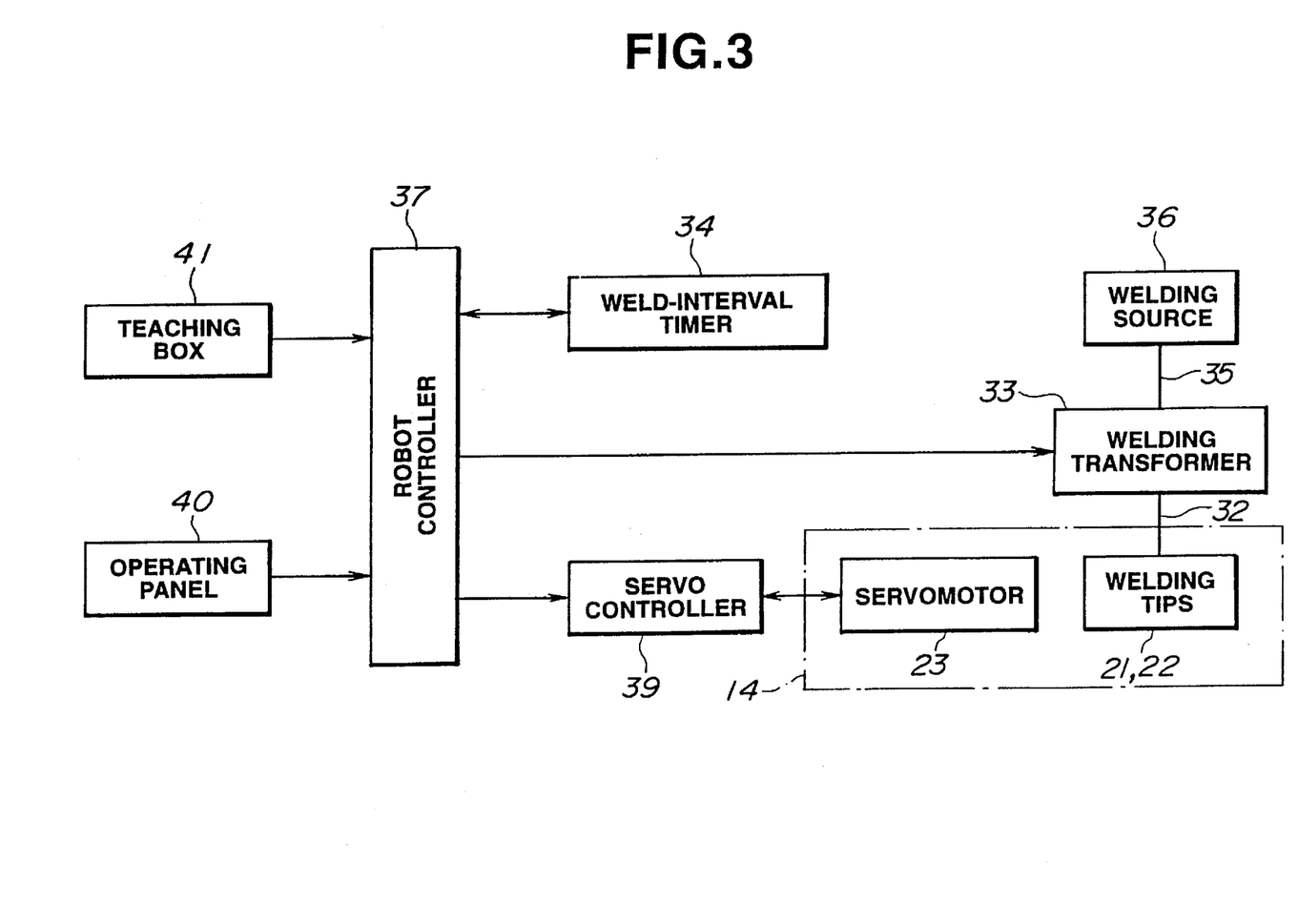
FIG. 3 is a block diagram illustrating the spot welding apparatus or the embodiment.

Referring now to FIG. 3, the welding tips 21 and 22 are connected through the cable 32 to the welding transformer 33. The transformer 33 is connected via a primary electrical cable 35 to a welding source 36. As the transformer, a high-current and low-voltage power transformer is in general used to supply a welding current for spot-welding. That is to say, the welding transformer 33 functions as a welding current regulator. A spot-welding unit is attached to the end portion of the second robot arm 13, and thus the welding-current supply timing is controlled in accordance with a control signal generated from a robot controller 37 which is included in the spot welding robot control system. As is generally known, the welding robot R has a plurality of electric motors (not shown) attached to or accommodated in the mechanically linked components, namely the stationary base 10, the rotary base 11, the first and second robot arms 12 and 13. A stepper motor is used as the electric motor. The robot controller 37 also outputs a control signal to each electric motor for a travel adjustment of the robot arm, namely the respective angular position adjustments with respect to the six axes. As seen in FIG. 3, the robot controller 37 is electronically connected to the welding transformer 33 to adjust a value of the welding current applied to the welding tips 21 and 22. The robot controller 37 is electronically connected to the weld-interval timer 34 to adjust the welding-current supply timing for the welding tips 21 and 22. The timer 34 is responsive to a welding start instruction generated from the robot controller 37, for initiating a welding timing control based on a preset timing diagram. In addition to a start timing of welding and a termination timing of welding, the timer 34 also adjusts a switching timing from one welding condition (e.g., a certain current value) to the other welding condition (e.g., the other current value) in spot-welding on the same weld point.

As seen in FIGS. 1 to 3, as previously described, the spot welding apparatus according to the invention includes the servomotor 23. A servomotor controller 39 is connected to the servo 23 for controlling the operation of the servo 23. For the sake of illustrative simplicity, although it is not shown, the servomotor controller 39 employs a pulse-duration modulator (not shown) and a servomotor amplifier (not shown), while the servo 23 accommodates therein a pulse generator (not shown). The pulse generator of the servo is connected to the servomotor amplifier of the servomotor controller 39 to produce a feedback signal representative of a revolution speed of the servomotor 23. The servomotor controller 39 is electronically connected to the robot controller 37, to control various operational timings of the servo 23, namely an activation timing of the servo and a deactivation timing of the servo, in accordance with a control signal produced by the robot controller 37. As seen in the left-hand side of FIG. 3, the robot controller 37 is also connected to both an operating panel 40 and a teaching box 41. The operating panel 40 is provided to input a start signal for a welding work of the welding robot R. The teaching box 41 is provided to input preselected teaching data via an input interface (not shown) to the robot controller 37. The robot controller 37 is cooperated respectively with the weld-interval timer 34, the welding transformer 33, and the servo controller 39, to simultaneously and arbitrarily adjust a weld time, a welding current, and a pressure applied to the work W, in case that the spot welding is made at every weld point or at one specified weld point. Thus, the welding condition (i.e., a weld time, a welding current, and a pressure onto the work) at every weld point or at the specified weld point can be timely changed with a high step response, on the basis of the preselected teaching data input from the teaching box 41.

For instance, the robot controller 37 receives the following preselected teaching data from the teaching box 41 during one cycle of spot welding at one weld point.

| 1: RELOCATION POSITIONING | | |
|---|---|---|
| 2: T1 = 100 (ms), | P1 = 100 (kgf), | i1 = 0 (A) |
| 3: T2 = 60 (ms), | P2 = 300 (kgf), | i2 = UP |
| 4: T3 = 160 (ms), | P3 = 200 (kgf), | i3 = 8000 (A) |
| 5: T4 = 40 (ms), | P4 = 250 (kgf), | i4 = DOWN |
| 6: T5 = 60 (ms), | P5 = 100 (kgf), | i5 = 0 (A) |
| 7: RELOCATION | | | where T1 to T5 designate various preselected time intervals, P1 to P5 designate various preselected pressure levels of pressure applied to the work W, i1 to i5 designate various preselected current values of welding current applied to the work W.

Figure 4:
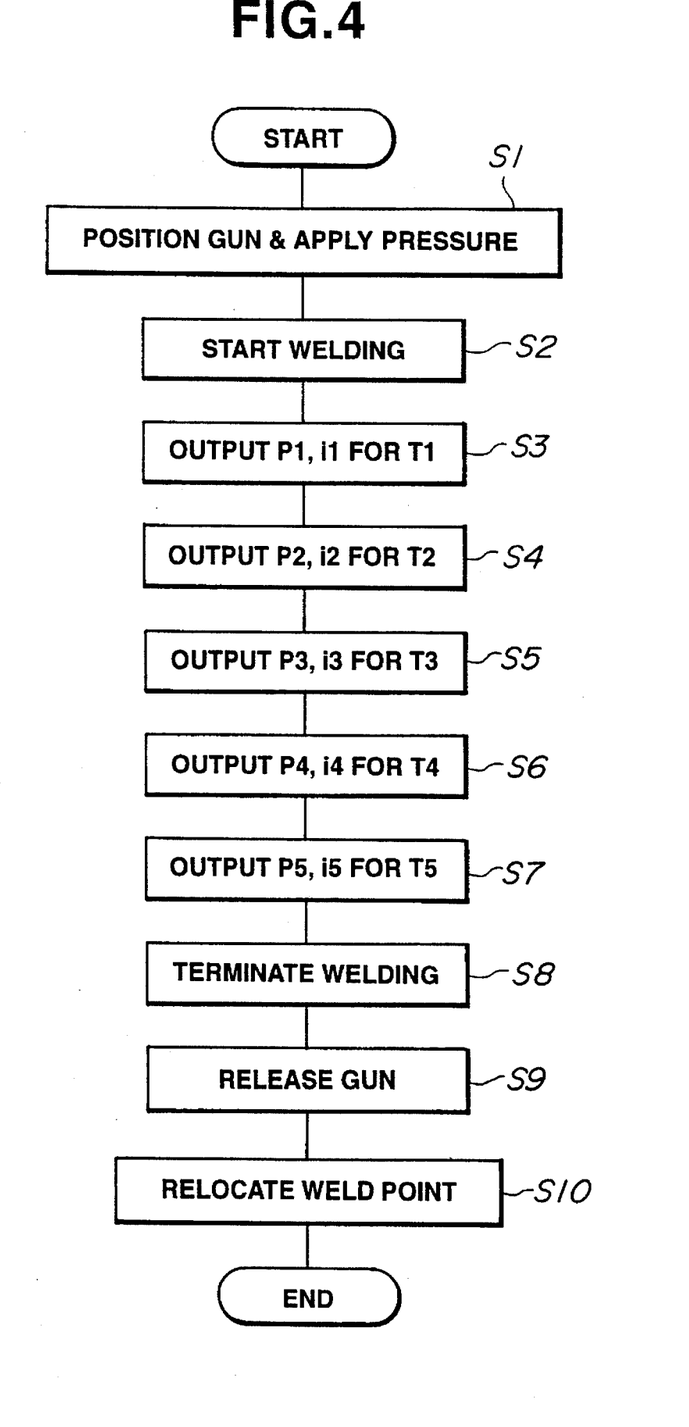
FIG. 4 is a flow diagram illustrating a control flow executed by the spot welding apparatus of the embodiment.

In case of the example of the previously-noted teaching data, the spot welding apparatus of the invention operates in accordance with the control flow illustrated in FIG. 4.

In step S1, the robot controller 37 starts to adjust the angular position of each axis of the welding robot R through pivotal or rotational movements of the respective robot arms in response to the start signal input from the operating panel 40, so as to position the opposing welding tips 21 and 22 attached to the welding gun 14 at a predetermined weld point on the work W. Upon the welding gun 14 has approached a preset distance spaced from the predetermined weld point, the servomotor controller 39 starts to drive the servomotor 23 to decrease a clearance defined between the opposing welding tips, while continuing the approach to the weld point. Just after completion of the positioning the welding gun 14, a preselected slight magnitude of pressure is applied to the weld point through the welding tip set 21 and 22 each of which is brought into contact with either one of side faces of the work W by way of rotation of servomotor 23. In this manner, the work W is initially preloaded at the weld point.

Figure 5:
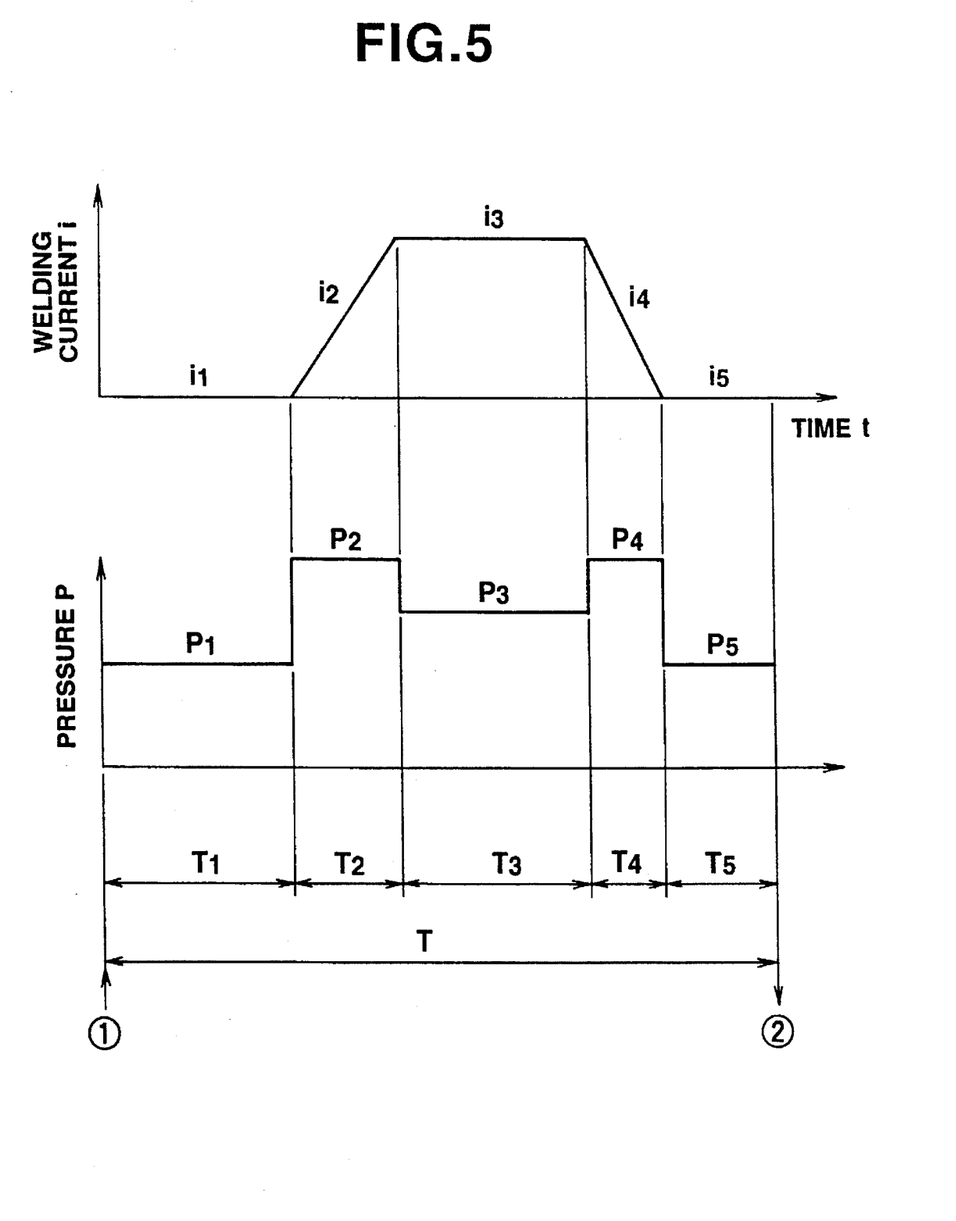
FIG. 5 is a timing chart illustrating the operation of the spot welding apparatus of the embodiment.

In step S2, the robot controller 37 outputs a welding start indicative signal to the weld-interval timer 34 at a welding start timing ① of the timing chart illustrated in FIG. 5. The timer 34 generates a timing control signal based on a preselected welding timing map, so as to adjust a welding time interval, i.e., a welding start timing and a welding termination timing, and a switching timing from one welding condition to the other welding condition with respect to one weld point during welding.

In step S3, the robot controller 37 outputs control signals to the transformer 33 and the servomotor controller 39, so that the welding current value and the pressure level at the given weld point of the work W are set and maintained at the preselected current value i1 (0) and at the preselected pressure level P1, namely 100 kgf, during the preselected time interval T1 (squeeze time=100 ms).

In step S4, after the time T1 has elapsed, the robot controller 37 controls the transformer 33 and the servomotor controller 39 to linearly increase the welding current from the current value i1 (0) to the other current value i3 (8000 A) in accordance with the up-sloped line i2 illustrated in FIG. 5 and to step up the applied pressure from the pressure level P1 (100 kgf) to the higher pressure level P2 (300 kgf), during the preselected time interval T2 (up-slope time=60 ms).

In step S5, after the time T2 has elapsed, the robot controller 37 controls the transformer 33 and the servomotor controller 39 to set and to maintain the welding current value at the preselected current value i3, namely 8000 A and to step down the pressure level at the preselected standard pressure level P3, namely 200 kgf, during the preselected time interval T3 (usual weld time (main weld time)=160 ms).

In step S6, after the time T3 has elapsed, the transformer 33 is controlled to linearly decrease the welding current from the current value i3 (8000 A) to the preselected current value i5 (0) in accordance with the down-sloped line i4 illustrated in FIG. 5 and to step up the applied pressure from the pressure level P3 (200 kgf) to the preselected pressure level P4 (250 kgf). The preselected current value i5 and the pressure level P5 are both maintained during the preselected time interval T4 (down-slope time =40 ms)

In step S7, after the time T4 has elapsed, the welding current value and the pressure level are set and maintained at the preselected current value i5 (0) and at the preselected pressure level P5, namely 100 kgf, during the preselected time interval T5 (hold time=60 ms).

In step S8, upon the elapsed time T5 has detected by the timer 34, one cycle of spot-welding process to the predetermined weld point of the work W is terminated at a welding termination timing ② of the timing chart illustrated in FIG. 5.

In step S9, the robot controller 37 controls the servomotor controller 39 to produce reverse rotation of the servomotor 23, with the result that the clearance between the opposing pair of welding tips 21 and 22 is quickly enlarged. In the timing chart illustrated in FIG. 5, the time T corresponds to the total welding time required for completion of spot welding at the predetermined weld point.

In step S10, the welding gun 14 is relocated to the other weld point. Likewise, a welding work at the next weld point starts subsequently.

As will be appreciated from the above, the spot welding apparatus according to the invention can variably control a plurality of welding conditions, namely a welding current, a pressure applied onto the work, and a weld time, simultaneously and at a real time, during spot welding at every welding point on the work or at one specified welding point on the work. Additionally, the welding condition at one specified welding point can be further subdivided into at least two different welding conditions even during spot-welding for the one specified welding point, on the basis of teaching data input through the teaching box 41. Thus, the spot welding apparatus of the invention can easily and accurately set an optimal welding condition for each welding point. For example, as clearly seen in FIG. 5, in case of application of the welding current to the one specified welding point, the pressure applied the welding point is stepped up to the pressure level P2 slightly greater than the pressure level P3 just after starting to apply a welding current and stepped up to the pressure level P4 slightly greater than the pressure level P3 just before terminating application of welding current. In this manner, the welding condition is minutely adjusted at the one specified welding point during spot welding. The previously-described step-up adjustment of the pressure applied to the work is advantageous to effectively reduce spatter loss. Furthermore, since an optimal welding condition can be provided irrespective of a thickness of work W or a material of work W, a sufficient welding strength may be obtained and a high quality of face of weld may be ensured. In addition, an adjustment of pressure applied to the work W to a lower level or a higher level can be quickly made at a real time in synchronization with the preset welding time table based on the teaching data. This reduces the total welding time required for welding work, namely the cycle time for the entire welding work. Thus, the productivity of weld products can be enhanced. Moreover, since the switching operation of the pressure applied to the work W is executed by means of the servomotor controller through a numerical control based on the teaching data, positive and negative fluctuations or dispersions in the applied pressure would be eliminated at a minimum. Owing to such a high accuracy of pressure adjustment, the spot welding apparatus of the invention can be suitably applied for various kinds of spot welding work, by virtue of various suitably selected teaching data.

In the previously-explained embodiment, although the weld-interval timer 34 is arranged outside of the robot control system 24 as a peripheral part of the control system 24, the timer 34 may be integrally accommodated in the control system 24.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A spot welding apparatus comprising:
   a welding gun having a pair of opposing welding electrodes either one of which is movable towards the other to apply a pressure onto a work and away from the other to release the pressure;
   a servomotor attached to said welding gun for adjusting the pressure applied to the work through movement of said movable welding electrode;
   a servomotor controller for controlling an operation of said servomotor;
   a welding current regulator for adjusting a value of welding current applied through the opposing electrodes to the work;
   a weld-interval timer arranged for adjusting at least one weld time interval and weld timing for said welding current and said pressure both applied to the work; and
   a spot welding controller electronically connected to said servomotor controller, said welding current regulator and said weld-interval timer, for simultaneously and arbitrarily adjusting the welding current, the pressure, the weld time interval and the weld timing, based on teaching data, during one cycle of spot welding at one specified welding point on the work.

2. A spot welding apparatus comprising:
   a welding gun having a pair of opposing welding electrodes either one of which is movable towards the other to apply a pressure onto a work and away from the other to release the pressure;
   a servomotor attached to said welding gun for adjusting the pressure applied to the work through movement of said movable welding electrode;
   a servomotor controller for adjusting a rotational movement of said servomotor to produce the movement of said movable welding electrode;
   a welding current regulator for adjusting a value of welding current applied through the opposing electrodes to the work;
   a weld-interval timer arranged for adjusting at least one weld time interval and weld timing for said welding current and said pressure both applied to the work; and
   a spot welding controller electronically connected to said servomotor controller, said welding current regulator and said weld-interval timer, for simultaneously and arbitrarily adjusting the welding current, the pressure, the weld time interval and the weld timing, based on teaching data,
   wherein said spot welding controller includes means for providing a given welding mode for one specified welding point on the work, in which (a) a first pressure having a given pressure level and a first welding current having a given low current value are applied to the work for a first period of weld time, (b) a second pressure having a higher pressure level than said first pressure and a second welding current which current increases in proportion to an elapsed time after said first period has elapsed, are applied to the work for a second period of weld time, (c) a third pressure having a predetermined medium pressure level midway between said first and second pressures and a third welding current having a given high current value are applied to the work for a third period of weld time, (d) a fourth pressure having a higher pressure level than said third pressure and a fourth welding current which current decreases in proportion to an elapsed time after said third period has elapsed, are applied to the work for a fourth period of weld time, and (e) a fifth pressure having a given lower pressure level than said third pressure and a fifth welding current having a given low current value are applied to the work for a fifth period of weld time, and said first to fifth periods are arrayed in that order.

3. A spot welding apparatus, comprising:

a welding gun having a pair of opposing welding electrodes either one of which is movable towards the other to apply a pressure onto a work and away from the other to release the pressure;

a servomotor attached to said welding gun for adjusting the pressure applied to the work through movement of said movable welding electrode;

a servomotor controller for adjusting a rotational movement of said servomotor through a numerical control to produce the movement of said movable welding electrode;

a welding transformer for adjusting a value of welding current applied through the opposing electrodes to the work;

a weld-interval timer arranged for adjusting at least one weld time interval and weld timing for said welding current and said pressure both applied to the work; and a spot welding controller electronically connected to said servomotor controller, said welding transformer and said weld-interval timer, for simultaneously and arbitrarily adjusting the welding current, the pressure, the weld time interval and the weld timing, based on teaching data, wherein said spot welding controller includes a spatter-loss reduction means for reducing spatter loss by stepping up the pressure applied to the work to a greater pressure level than a predetermined medium pressure applied to the work for a predetermined intermediate weld time interval, for a predetermined first time period shorter than the predetermined intermediate weld time interval just after starting to apply the welding current and for a predetermined second time period shorter than the predetermined intermediate weld time interval just before terminating to apply the welding current, during one cycle of spot welding at one specified welding point on the work.

4. A spot welding apparatus as recited in claim 3, wherein said spot welding controller operates for simultaneously and arbitrarily adjusting the welding current, the pressure, the weld time interval and the weld timing based on the teaching data during one cycle of spot welding at one specified welding point on the work.

5. A spot welding apparatus comprising:

a welding gun having a pair of opposing welding electrodes either one of which is movable towards the other to apply a pressure onto a work and away from the other to release the pressure;

a servomotor attached to said welding gun for adjusting the pressure applied to the work through movement of said movable welding electrode;

a servomotor controller for controlling an operation of said servomotor;

a welding current regulator for adjusting a value of welding current applied through the opposing electrodes to the work;

a weld-interval timer arranged for adjusting at least one weld time interval and weld timing for said welding current and said pressure both applied to the work; and a spot welding controller electronically connected to said servomotor controller, said welding current regulator and said weld-interval timer, for simultaneously and arbitrarily adjusting the welding current, the pressure, the weld time interval and the weld timing, based on teaching data, during one cycle of spot welding at one specified welding point on the work, so that the pressure is stepped up and down to a plurality of pressure levels and that the welding current is linearly increased for a predetermined short time duration after initiation of application of the welding current and is held constant at a predetermined current level for a predetermined time duration after reaching the predetermined current level, and is then decreased linearly to zero for a predetermined short time duration until termination of application of the welding current.

* * * * *